J. R. WESTON.
DRILL.
APPLICATION FILED SEPT. 7, 1909.
972,666.
Patented Oct. 11, 1910.
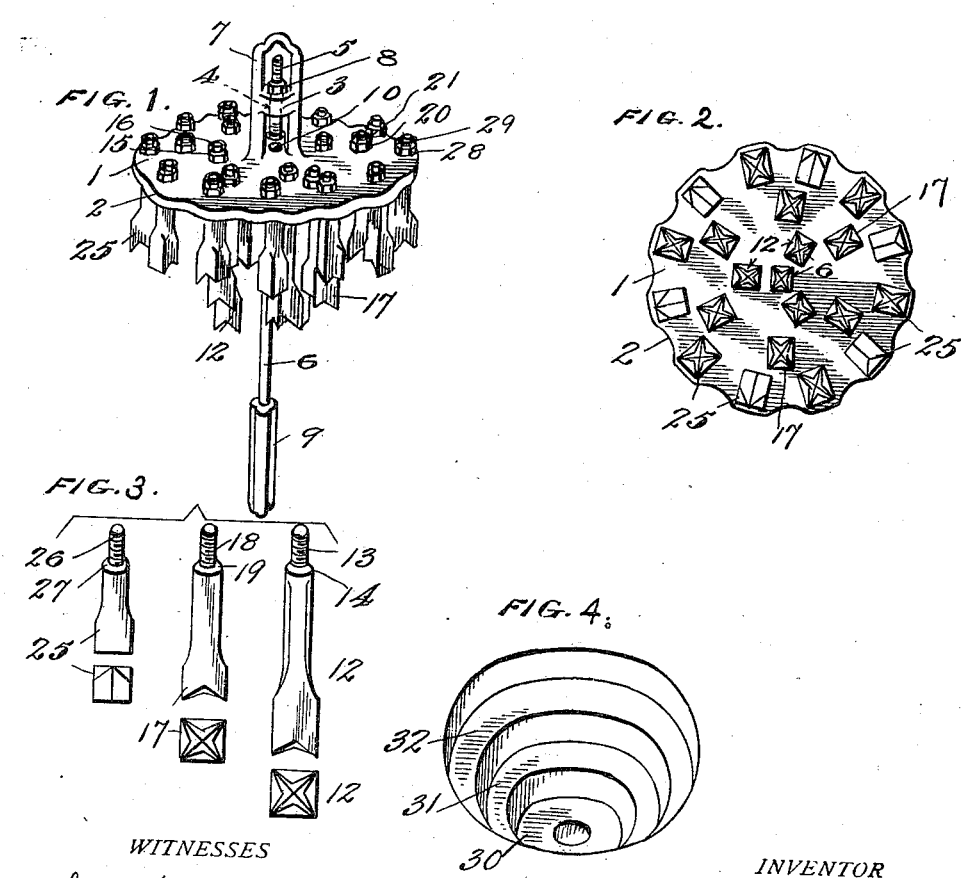

UNITED STATES PATENT OFFICE.

JOHN R. WESTON, OF DUBUQUE, IOWA.

DRILL.

972,666.  Specification of Letters Patent.  Patented Oct. 11, 1910.

Application filed September 7, 1909. Serial No. 516,543.

*To all whom it may concern:*

Be it known that I, JOHN R. WESTON, a citizen of the United States, residing at Dubuque, in the county of Dubuque and State of Iowa, have invented certain new and useful Improvements in Drills, of which the following is a specification.

This invention relates to rock-drills and is particularly adapted for use in submerged mines for sinking shafts of any desired depth beneath the water.

Among the objects in view is to provide a drill of the described character which will be of simple and inexpensive construction and adapted for sinking shafts through rock or other materials under water, such as in submerged mines, and for readily removing the slush and cuttings from the shaft.

The invention consists in the novel construction, arrangement and combination of parts as hereinafter fully described, illustrated in the accompanying drawing and pointed out in the appended claims.

In the drawing: Figure 1 is a perspective view of the drill. Fig. 2 is an underside view of the drill. Fig. 3 is a view showing different kinds of drills or cutters used in constructing my improved drill proper. Fig. 4 is a perspective view showing the character of hole cut by my drill.

My improved drill comprises a drill-head 1 of generally circular outline provided with a corrugated edge 2. The head is provided with an integral central hub 3 having an aperture 4 through which projects the shank 5 of a drill or cutter 6 having an X-shaped cutting point 9. The hub has an integral yoke 7 and the drill 6 is secured to the hub by a nut 8 and set-screw 10. The drill 6 acts as a guide to give direction to the other drills. Around the drill 6 and adjacent thereto are grouped three drills or cutters 12 having X-shaped cutting faces and each having a shank 13 and a shoulder 14, said shanks extending up through apertures in the drill-head until the shoulders 14 abut against said head and said shanks being threaded to receive each a nut 15 and lock-nut 16 for securing the drills in position. The drills 12 are preferably three in number but their number may be varied, as may also their length.

Grouped around the drills 12 are a plurality of drills or cutters 17 preferably six. The length of these drills 17 is somewhat shorter than the drills 12, preferably four inches shorter, and have X-shaped cutting faces. Each drill 17 has a threaded shank 18 and a shoulder 19, said shanks passing through the drill-head until the shoulders abut against said head, and being secured by nut 20 and lock-nut 21. The number of drills 17 as well as the length thereof may be varied but in any event they must be shorter than the drills 12.

Grouped around the drills 17 adjacent the circumferential edge of the drill-head are a plurality of drills or cutters 25 preferably twelve in number. This group of drills 25 is composed of six drills each having an X-shaped cutting face and six drills each having somewhat of a T-shaped cutting face, the two kinds of drills alternating with each other. The number of these drills 25 may be varied and the length thereof may also be varied but must in any event be shorter than the drills 17. I preferably make the drills 25 four inches shorter than the drills 17.

The T-shaped drills are positioned so that the cutting faces will project about one-half an inch beyond the circumferential edge of the drill-head, whereby the free descent or movement of the drill-head into the hole being cut will be permitted. Each drill 25 has threaded shank 26 and a shoulder 27 and these shanks are passed through the drill-head until the shoulders abut against the same and are then secured by nut 28 and lock-nut 29. The difference in length of the three groups of drills 12, 17, 25, form the variation in the cuttings done in the rock.

In Fig. 4, I show the character of hole drilled by my improved drill. The inner and deeper portion 30 of the hole is drilled by the inner and longer group of drills 12; the portion 31 by the somewhat shorter drills 17, and the portion 32 by the still shorter drills 25.

In practice my drill is made very heavy, say about two tons in weight, and operates by the force of the impact of the drills upon the rock, such impact being obtained by alternately raising and dropping the drill from a suitable height.

A shaft of from two to six feet in diameter can be drilled by my device and of any desired depth, and in operation the slush and cuttings will run down into the deeper center hole which in practice is usually six inches in diameter. When drilling deep holes in rock under water it is difficult to remove the slush and cuttings, but I can readily do this by means of a suitably constructed bucket which forms no part of the present invenion. When operating in rock which is not under water, then water must be supplied from above in order to secure the proper operation of the drills, and the corrugations in the drill-head permit the free ingress of water from above to the drills. The device can be made to cut a hole any number of feet in diameter by changing the size of the drill.

What I claim is:

1. A drill comprising a drill-head having a corrugated circumferential edge, and an integral central hub provided with an aperture, a centrally-arranged drill having a shank extending upwardly through the drill-head and the aperture in the hub, means for securing the said drill in position, and a plurality of groups of drills or cutters arranged around the said central drill and carried by the drill-head, the drills of the innermost group being the longest and those of the other groups being successively shorter toward the circumferential edge of the drill-head.

2. A drill comprising a drill-head having a corrugated circumferential edge, and an integral central hub having an aperture, a centrally-arranged drill having a shank extending upwardly through the drill-head and the aperture in the hub, means securing the central drill in position, a plurality of groups of drills or cutters arranged around the central drill and carried by the drill-head, and each having a shank extending through the drill-head, a nut screwing upon each of the shanks and securing the drills in position, the drills of the innermost group being the longest and those of the other groups being successively shorter toward the circumferential edge of the drill-head.

3. A drill comprising a drill-head having an integral central hub provided with an aperture and a yoke integral with the hub, a centrally-arranged drill having a shank extending through the drill-head and the said aperture, means for securing said drill in position, a plurality of groups of drills or cutters arranged around the central drill and secured to the drill-head, the drills of the innermost group being the longest and those of the other groups being successively shorter toward the circumferential edge of the drill-head, a portion of the drills in the outermost groups having X-shaped cutting faces and another portion having T-shaped cutting faces, arranged to alternate as described, the drills having the T-shaped faces being arranged so that the said last mentioned faces will project slightly beyond the circumferential edge of the drill-head for the purpose set forth.

In testimony whereof I affix my signature in presence of two witnesses.

JOHN R. WESTON.

Witnesses:
R. W. SPENSLEY,
ALEX SIMPLOT.